United States Patent [19]

Birkle et al.

[11] Patent Number: 5,015,709

[45] Date of Patent: May 14, 1991

[54] RADIATION-CURABLE LIQUID RESIN FOR SECONDARY COATING OF LIGHTWAVE GUIDES

[75] Inventors: Siegfried Birkle, A/Aisch; Hans-Dieter Feucht, Erlangen; Rainer Kamps, Coburg; Eva Rissel, Forchheim, all of Fed. Rep. of Germany

[73] Assignee: Siemens Aktiengessellschaft, Berlin & Munich, Fed. Rep. of Germany

[21] Appl. No.: 286,461

[22] Filed: Dec. 19, 1988

[30] Foreign Application Priority Data

Dec. 23, 1987 [DE] Fed. Rep. of Germany ....... 3743992

[51] Int. Cl.$^5$ ................................................. C06F 2/46
[52] U.S. Cl. ..................... 526/279; 526/301; 526/313; 525/920; 525/921; 525/922; 522/90; 522/91; 522/92; 522/93; 522/94; 522/95; 522/96; 522/97; 522/98; 522/99; 522/100
[58] Field of Search ............. 526/313, 301; 522/90, 522/91, 92, 93, 94, 95, 96, 97, 98, 99, 100; 525/920, 921, 922; 560/166, 224

[56] References Cited

U.S. PATENT DOCUMENTS

| | | | |
|---|---|---|---|
| 3,264,370 | 8/1966 | Ott et al. | 260/834 |
| 4,221,892 | 9/1980 | Baron et al. | 525/531 |
| 4,311,726 | 1/1982 | Hacker et al. | 427/54 |
| 4,383,091 | 5/1983 | Burton | 525/528 |
| 4,649,082 | 3/1987 | Friedlander | 526/320 |
| 4,718,748 | 1/1988 | Broer et al. | 350/96.30 |

FOREIGN PATENT DOCUMENTS

| | | |
|---|---|---|
| 0204497 | 12/1986 | European Pat. Off. . |
| 0206159 | 12/1986 | European Pat. Off. . |
| 0235772 | 9/1987 | European Pat. Off. . |
| 1006587 | 10/1965 | United Kingdom . |

*Primary Examiner*—Joseph L. Schofer
*Assistant Examiner*—Jeffrey T. Smith
*Attorney, Agent, or Firm*—Kenyon & Kenyon

[57] ABSTRACT

The invention provides a radiation-curable liquid resin for use as a secondary coating of lightwave guides which is a reaction product of (meth)acrylic acid or -acid chloride or isocyanatoalkyl-(meth)acrylate with a 1:2 addition compound of a diepoxide with a mean molecular weight $\leq 1000$ and a short-chain $\alpha,\omega$-diol with a mean molecular weight $\leq 700$ or with a 1:2 addition compound of a diepoxide with a mean molecular weight $\leq 400$ and a monovalent aliphatic alcohol with a mean molecular weight $\leq 200$, where the diepoxide is an aliphatic-aromatic or aromatic diglycidylether, an aliphatic or cycloaliphatic diepoxide or a silicon-organodiepoxide, and where the short-chain $\alpha,\omega$-diol is an $\alpha\omega$-hydroxy-terminated polyoxyalkylene, an $\alpha,\omega$-hydroxy-terminated polyester, an $\alpha,\omega$-hydroxy-terminated polybutadiene, an $\alpha,\omega$-hydroxyterminated organo-functional polysiloxane or an $\alpha,\omega$-alkanediol with a mean molecular weight $\leq 200$.

11 Claims, No Drawings

RADIATION-CURABLE LIQUID RESIN FOR SECONDARY COATING OF LIGHTWAVE GUIDES

BACKGROUND OF THE INVENTION

The invention relates to a radiation-curable liquid resin for a secondary coating of lightwave guides. The invention further relates to a secondary coating produced from the liquid resin and a lightwave guide with this secondary coating.

Lightwave guides in general have two coatings: a soft primary coating and a firm secondary coating. Currently, primary coatings are predominantly radiation-cured urethane acrylates. As secondary coatings, radiation-cured epoxy acrylates or urethane acrylates are predominantly being used (see, for example: "Polym. Mater. Sci. Eng.," Vol. 55, 1986, pages 536 to 539). The resins used as coatings must be radiation-curable so as to permit rapid and cost-effective curing. The resins must also be liquid so that it is possible to process them essentially solvent-free in order to meet the requirements regarding environmental protection.

The epoxy and urethane acrylates used as secondary coatings have a sufficiently high glass transition range ($Tg \geq +60°$ C.), and they are compatible with a primary coating based on urethane acrylate. In the manufacture of coatings, it is also important that the appropriate liquid resins have high radiation sensitivity in order to permit high curing rates.

For example, "Chemical Abstracts," Vol. 106 (1987), page 7, No. 161368y, discloses a coating material for optical glass fibers on a polyoxyalkylene base which can serve for the production of secondary coatings. This coating material contains oligomers which are obtained through the conversion of hydroxy-terminated aliphatic linear compounds, such as polypropylene glycol, with diisocyanates and trishydroxyalkylisocyanurate-di(meth-acrylates. Such resins have more than two radiation-curable groups per molecule so that they should have a high curing rate. However, the coupling of the radiation-curable groups via bis-urethane structures (using diisocyanates) results in resins having a high viscosity. It is therefore required to add to these resins large quantities of reactive thinners in order to be able to apply them as coating materials. This thinning step not only entails additional production costs but it is also accompanied by other disadvantages due to the high vapor pressure of the reactive thinners.

It is an object of the invention to provide a radiation-curable liquid resin which has a high radiation sensitivity.

It is another object of the invention to provide a radiation-curable liquid resin with a viscosity which, at most, requires the addition of only relatively small amounts of thinning agents, to be used for the manufacture of a secondary coating of lightwave guides.

It is a further object of the invention to provide secondary coatings for lightwave guides which have a glass transition range of $\geq 60°$ C. and which are compatible with the primary coatings, especially primary coatings based on urethane acrylates.

SUMMARY OF THE INVENTION

The objects of the invention are achieved by providing a resin which is a reaction product of (meth)acrylic acid or -acid chloride or isocyanatoalkyl-(meth)acrylate with a 1:2 addition compound of a diepoxide with a mean molecular weight $\leq 1000$ and a short-chain $\alpha,\omega$-diol with a mean molecular weight $\leq 700$ or with a 1:2 addition compound of a diepoxide with a mean molecular weight $\leq 400$ and a monovalent aliphatic alcohol with a mean molecular weight $\leq 200$, where the diepoxide is an aliphatic-aromatic or aromatic diglycidylether, an aliphatic or cycloaliphatic diepoxide or a silicon-organodiepoxide, and where the short-chain $\alpha,\omega$-diol is an $\alpha,\omega$-hydroxy-terminated polyoxyalkylene, an -hydroxy-terminated polyester, an $\alpha,\omega$-hydroxy-terminated polybutadiene, an $\alpha,\omega$-hydroxy-terminated organo-functional polysiloxane or an $\alpha,\omega$-alkanediol with an mean molecular weight $\leq 200$.

DETAILED DESCRIPTION OF THE INVENTION

The diepoxide used in the manufacture of the 1:2 addition compound forming the basis of the resin according to the invention may be an aliphatic-aromatic or aromatic diglycidylether. The aliphatic-aromatic diglycidylether may preferably have heteroatoms, such as oxygen atoms, in the aliphatic chain.

Preferred diepoxides or short-chain $\alpha,\omega$-diols are the following compounds:

- the diglycidylether of a bisphenol A-propyleneoxide-addition compound (as aliphatic-aromatic diglycidylether);
- bisphenol A- or bisphenol F-diglycidylether (as aromatic diglycidylether);
- 1,2,7,8-diepoxyoctane (as aliphatic diepoxide);
- 3,4-epoxycyclohexylmethyl-3,,4,-epoxycyclohexanecarboxylate (as cycloaliphatic diepoxide);
- bis-(3-glycidoxypropyl)-tetramethyldisiloxane (as silicon-organodiepoxide);
- polytetrahydrofuran, polypropylene glycol or an ethyleneoxide-tetrahydrofuran-copolymer (as $\alpha,\omega$-hydroxy-terminated polyoxyalkylene);
- polycaprolactonediol (as $\alpha,\omega$-hydroxy-terminated polyester);
- 1,3-bis-(4-hydroxybutyl)-tetramethyldisiloxane (as $\alpha\omega$-hydroxy-terminated organo-functional polysiloxane);
- ethylene glycol, 1,3-propanediol, 1,4-butanediol or 1,10-decanediol (as $\alpha,\omega$-alkanediol).

1:2 addition compounds which are formed in the conversion of diepoxides (formula I) with $\alpha,\omega$-diols (formula II) have a structure corresponding to the general formula III:

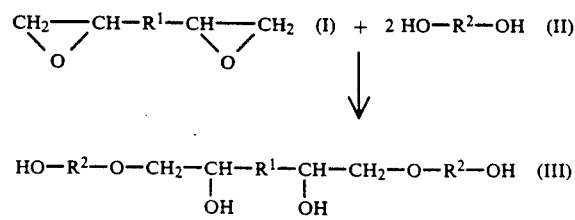

Cycloaliphatic diepoxides yield, for example, 1:2 addition compounds corresponding to the general formula IV (as well as corresponding isomers):

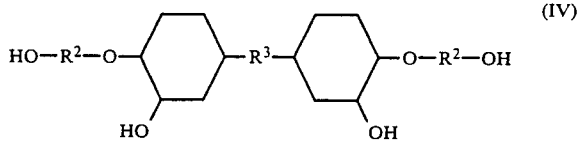

1:2 addition compounds which are formed in the conversion of diepoxides (formula V) with monovalent alcohols (formula VI) have a structure corresponding to the general formula VII:

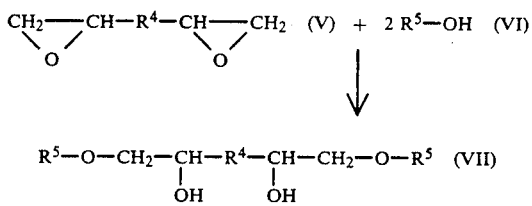

wherein $R^1$ to $R^4$ = alkylene
$R^5$ = alkyl

For the preparation of the 1:2 addition compounds the diepoxide and the diol or the monovalent alcohol are allowed to react with each other in an organic solvent with a low boiling point (such as trichloromethane) at an increased temperature (<80° C.) in the presence of an acidic catalyst (such as trifluoromethanesulfonic acid). The ratio of diepoxide to diol can be between 1:2 and 1:6. In the case of monovalent alcohols, the ratio of diepoxide to monovalent alcohol can be 1:2, or the monovalent alcohol can be used in even greater amounts. In the conversion with diols, the reaction product may, in addition to the 1:2 addition compound, also contain small fractions of oligomers, for example of the following structure:

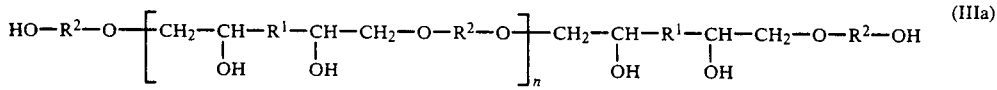

The 1:2 addition compounds are subsequently allowed to react with either: (a) acrylic acid or methacrylic acid or the corresponding acid chloride; or (b) isocyanatoalkyl-acrylate or isocyanato- alkyl-methacrylate. By coupling on radiation-curable groups, the radiation-curable resins are formed in the following manner:

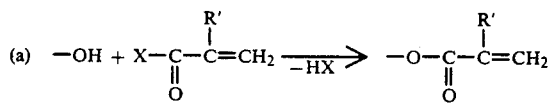

for example in (III); X = OH, Cl
R' = H, CH₃

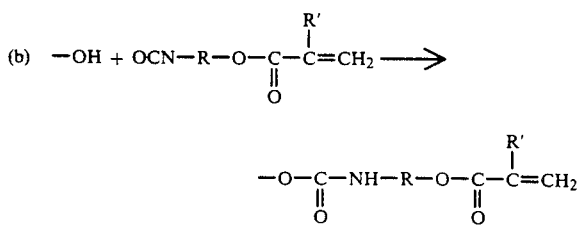

for example in (III);
R = alkylene
R' = H, CH₃

The liquid radiation-curable resins according to the invention have a viscosity which makes them suitable for the manufacture of secondary coatings. Furthermore, these resins possess a high radiation sensitivity and hence high curing rates. The 1:2 addition compound of diepoxides and diols permits coupling on up to four radiation-curable groups per molecule, so that the corresponding resins are highly sensitive to radiation such as UV radiation. The resins formed of the 1:2 addition compounds of diepoxides and monovalent alcohols have only two radiation-curable groups per molecule, however, due to their low molecular weight, the resins have a high density of radiation-curable groups present per unit of volume. Thus, these resins also have a high radiation sensitivity and, hence, high curing rates.

Secondary coatings manufactured of the radiation-curable liquid resins according to the invention have a glass transition range >60° C. Furthermore, these secondary coatings have polar groups and are, hence, compatible with primary coatings based on, inter alia, urethane acrylates. In particular, the secondary coatings according to the invention have good compatibility with the primary coatings which are described in the German Offenlegungsschrift 37 43 990 "Radiation-curable liquid resin for primary coating of lightwave guides" and Offenlegungsschrift 37 43 873 "Radiation-curable liquid resin for coating lightwave guides".

In conjunction with the following embodiment examples the invention will be described in greater detail.

EXAMPLE 1

300 g of a commercially available polytetrahydrofuran having an average molecular weight of 650 (=924 mole -OH) and 200 g dry trichloromethane, stabilized with 2-methyl-butene-2, are added into a 1 l four-neck flask (with stirrer, internal thermometer, dripping funnel and reflux cooler with drying tube). After the addition of approximately 1 ml trifluoromethanesulfonic acid as a catalyst, the mixture is heated to approximately 60° C. Subsequently, over a period of 30 min, 78.5 bisphenol A- diglycidylether ($\hat{=}$0.462 mole epoxide), dissolved in 100 g dry trichloromethane, are added dropwise while the, mixture is being stirred. The reaction mixture is subsequently stirred at 60° C. until no more epoxide can be demonstrated. After cooling, 10 g of cross-linked poly(4-vinylpyridine) are added and the mixture is stirred for 6 hours at room temperature. Subsequently, the mixture is suctioned off and pressure filtered through a 0.8μm membrane filter. The solvent is subsequently removed in vacuo at a bath temperature of approximately 80° C. Approximately 300 g of a 1:2 addition compound of the diepoxide and the polytetrahydrofuran, in the form of a clear slightly yellow oil, are obtained (OH value: 0.222 mole/100 g).

100 g of the 1:2 addition compound obtained in the above described manner, dissolved in 100 g of dry trichloromethane, are added into a 500 ml three-neck flask (with internal thermometer, dripping funnel, drying tube, and a magnet stirring rod). Approximately 0.5 ml of a dibutyltin dilaurate solution (10 g in 100 ml CHCl₃) are added as a catalyst. Subsequently, 34.4 g isocyanatoethyl-methacrylate ($\hat{=}0.222$ mole -NCO), dissolved in 30 g dry trichloromethane, are added dropwise over a period of 30 min at room temperature while the mixture is being stirred, with the reaction temperature not to exceed 30° C. The reaction mixture is subsequently stirred at room temperature until no more isocyanate can be demonstrated. The solvent is subsequently removed in vacuo at a bath temperature of 40° C. The yield is approximately 130 g of a clear, slightly yellow, resin with a viscosity of approximately 14 000 mPa.s (at 23° C).

An approximately 500μm thick layer of the resin is cured with electron beams under nitrogen (acceleration voltage: 1 MeV; dose 25 kGy). Clear films are obtained which have a glass transition temperature of 60° C.

From a sample of the resin which contains 2 percent by mass of a photoinitiator based on hydroxypropiophenone, approximately 500 μm thick films are cast, and completely cured by means of UV radiation within 30 s (UV radiator with a radiation intensity of 3 mW/cm²). The cured films are clear and strong and they have a glass transition temperature of 60° C. These films, as well as the films of the above described type are thus suitable as secondary coatings for lightwave guides.

EXAMPLE 2

Corresponding to example 1, 200 g of a commercially available polytetrahydrofuran with a mean molecular weight of 250 ($\hat{=}1.6$ mole -OH), dissolved in 150 g dry trichloromethane, are allowed to react, in the presence of approximately 1 ml trifluoromethanesulfonic acid, with 136 g bisphenol A-diglycidyl-ether ($\hat{=}0.8$ mole epoxide), dissolved in 100 g dry trichloromethane. The reaction mixture is then treated further in accordance with example 1 and processed. Approximately 315 g of a 1:2 addition compound of the diepoxide and the polytetrahydrofuran are obtained in the form of a clear slightly yellow oil (OH value: 0.469 mole/100 g).

100 g of the 1:2 addition compound obtained in the above described manner, dissolved in 100 g dry trichloromethane, and in the presence of approximately 0.5 ml of a dibutyltin dilaurate solution, are allowed to react over a period of an hour with 72.8 g isocyanatoethyl-methacrylate ($\hat{=}0.469$ mole -NCO), dissolved in 50 g dry trichloromethane, in accordance with example 1. The reaction mixture is subsequently treated further in accordance with example 1 and processed. Approximately 170 g of a clear, slightly yellow, resin with a viscosity of approximately 11000 mpa.s (at 23° C.) are obtained.

An approximately 500 μm thick layer of the resin is cured with electron beams under nitrogen (acceleration voltage: 1 MeV; dose: 25 kGy). Clear films are obtained which have a glass transition temperature of 72° C. Hence, the films are suitable as secondary coatings for lightwave guides.

EXAMPLE 3

In a 1l three-neck flask (with stirrer, internal thermometer and dripping funnel with drying tube), 286 g 1,4-butanediol ($\hat{=}6.3$ mole -OH), in the presence of approximately 0.5 ml trifluoromethanesulfonic acid, are allowed to react for a period of one hour with 500 g of a commercially available diglycidylether of a bisphenol A-propyleneoxide addition compound with a mean molecular weight of 750 ($\hat{=}1.05$ mole epoxide). The reaction mixture is subsequently treated further in accordance with example 1 and the mixture is stirred at room temperature for 2 hours after the addition of poly(4-vinylpyridine). The reaction mixture is then pressure filtered through an 8μm membrane filter. The excess 1,4-butanediol is subsequently removed in vacuo (pressure: <0.4 mbar) at a temperature of approximately 75° C. Approximately 475 g of a 1:2 addition compound of the diepoxide and the butanediol are obtained in the form of a clear viscous oil (OH value: 0.375 mole/100 g).

In a 250 ml three-neck flask (with stirrer, internal thermometer, and dripping funnel with drying tube), 100 g of the 1:2 addition product obtained in the above described manner are allowed to react, in the presence of approximately 0.1 ml of a dibutyltin dilaurate solution, with 58.2 g isocyanatoethyl-methacrylate ($\hat{=}0.375$ mole -NCO) in accordance with example 1. The reaction mixture is subsequently further treated in accordance with example 1 and processed. Approximately 150 g of a clear viscous resin having a viscosity of approximately 75000 mPa.s (at 25° C) are obtained.

An approximately 500μm thick layer of the resin is cured with electron beams under nitrogen (acceleration voltage: 1 MeV; dose 25 kGy). Clear films are obtained which have a glass transition temperature of 73° C. The films are, thus, suitable as secondary coatings for lightwave guides.

EXAMPLE 4

Corresponding to example 1, 74 g of 1-butanol ($\hat{=}1$ mole -OH), dissolved in 500 g dry trichloromethane, are allowed to react, in the presence of approximately 0.5 ml trifluoromethanesulfonic acid, with 181 g bis-(3-glycidoxypropyl)-tetramethyldisiloxane ($\hat{=}5$ mol epoxide), dissolved in 500 g dry trichloromethane. The reaction mixture is subsequently stirred at 60° C. until a residual epoxide content of <0.5% has been reached The solvent is subsequently removed in vacuo at a bath temperature of approximately 60° C. Approximtely 226 g of a 1:2 addition compound of the butanol and the silicon-organo-diepoxide are obtained in the form of a clear oil (OH value: 0.306 mole/100 g).

Corresponding to example 1, 100 g of the 1:2 addition product obtained in the above described manner, dissolved in 150 g dry trichloromethane, are allowed to react, in the presence of approximately 0.5 ml dibutyltindilaurate, over a period of 90 min with 47.5 g isocyanatoethylmethacrylate ($\hat{=}306$ mole -NCO) dissolved in 50 g dry trichloromethane. The reaction mixture is subsequently treated further in accordance with example 1 and processed. Approximately 145 g of a clear colorless resin with a viscosity of approximately 1100 [SIC] mPa.s (at 23° C) are obtained.

From a sample of the resin, approximately 300μm thick films are cast and completely cured by electron beam under nitrogen (acceleration voltage: 1 MeV; dose: 25 kGy). Elastic tear-resistant flexible films are obtained which have a glass transition temperature of 56° C. The films are thus suitable as secondary coatings for lightwave guides.

What is claimed is:

1. A radiation-curable liquid resin useful as a secondary coating of lightwave guides, comprising a reaction product of (meth)-acrylic acid or (meth)-acrylic acid chloride or isocyanatoalkyl-(meth)-acrylate with an addition compound selected from the group consisting of: (a) a 1:2 addition compound of a diepoxide with a mean molecular weight $\leq 1000$ and a short-chain $\alpha,\omega$-diol with a mean molecular weight $\leq 700$, and (b) a 1:2 addition compound of a diepoxide with a mean molecular weight $\leq 400$ and a monovalent aliphatic alcohol with a mean molecular weight $\leq 200$, where the diepoxide as an aliphatic-aromatic or aromatic diglycidylether, an aliphatic or cycloaliphatic diepoxide or a silicon-organic diepoxide, and where the short-chain $\alpha,\omega$-diol is an $\alpha,\omega$-hydroxy-terminated polyoxyalkylene, an $\alpha,\omega$-hydroxy-terminated polyester, an $\alpha,\omega$-hydroxy-terminated polybutadiene, an $\alpha,\omega$-hydroxy-terminated organo-functional siloxane, or an $\alpha,\omega$-alkanediol with a mean molecular weight $\leq 200$.

2. A radiation-curable liquid resin according to claim 1, wherein the aliphatic-aromatic diglycidylether has hetero atoms in the aliphatic chain.

3. A radiation-curable liquid resin according to claim 2, wherein the hetero atoms are oxygen atoms.

4. A radiation-curable liquid resin according to claim 1, wherein the diepoxide is the diglycidylether of: a bisphenol A-propyleneoxide addition compound; bisphenol A- or bisphenol F-diglycidylether; 1,2,7,8-diepoxyoctane, 3,4-epoxycyclohexylmethyl-3,,4,-epoxy-cyclohexanecarboxylate or bis-(3-glycidoxypropyl)-tetramethyldisiloxane.

5. A radiation-curable liquid resin according to claim 1, wherein the short-chain $\alpha,\omega$-diol is polytetrahydrofuran, polypropylene glycol, an ethyleneoxide-tetrahydrofuran-copolymer, polycaprolactonediol, 1,3-bis-(4-hydroxybutyl)-tetramethyldisiloxane, ethyleneglycol, 1,3-propanediol, 1,4-butanediol, or 1,10-decanediol.

6. A radiation-curable liquid resin according to claim 3, wherein the short-chain $\alpha,\omega$-diol is polytetrahydrofuran, polypropylene glycol, an ethyleneoxide-tetrahydrofuran-copolymer, polycaprolactonediol, 1,3-bis-(4-hydroxybutyl)-tetramethyldisiloxane, ethyleneglycol, 1,3-propanediol, 1,4-butanediol, or 1,10-decanediol.

7. A radiation-curable liquid resin according to claim 4, wherein the short-chain $\alpha,\omega$-diol is polytetrahydrofuran, polypropylene glycol, an ethyleneoxide-tetrahydrofuran-copolymer, polycaprolactonediol, 1,3-bis-(4-hydroxybutyl)-tetramethyldisiloxane, ethyleneglycol, 1,3-propanediol, 1,4-butanediol, or 1,10-decanediol.

8. A secondary coating for lightwave guides, comprising at least one radiation-cured resin according to claim 1.

9. A secondary coating for lightwave guides, comprising at least one radiation-cured resin according to claim 4.

10. A secondary coating for lightwave guides, comprising at least one radiation-cured resin according to claim 5.

11. A lightwave guide having a secondary coating according to claim 8.

* * * * *